Nov. 8, 1932.  J. STRINDLUND  1,886,755
SCREW PRESS AND THE LIKE
Filed March 22, 1929   2 Sheets-Sheet 1
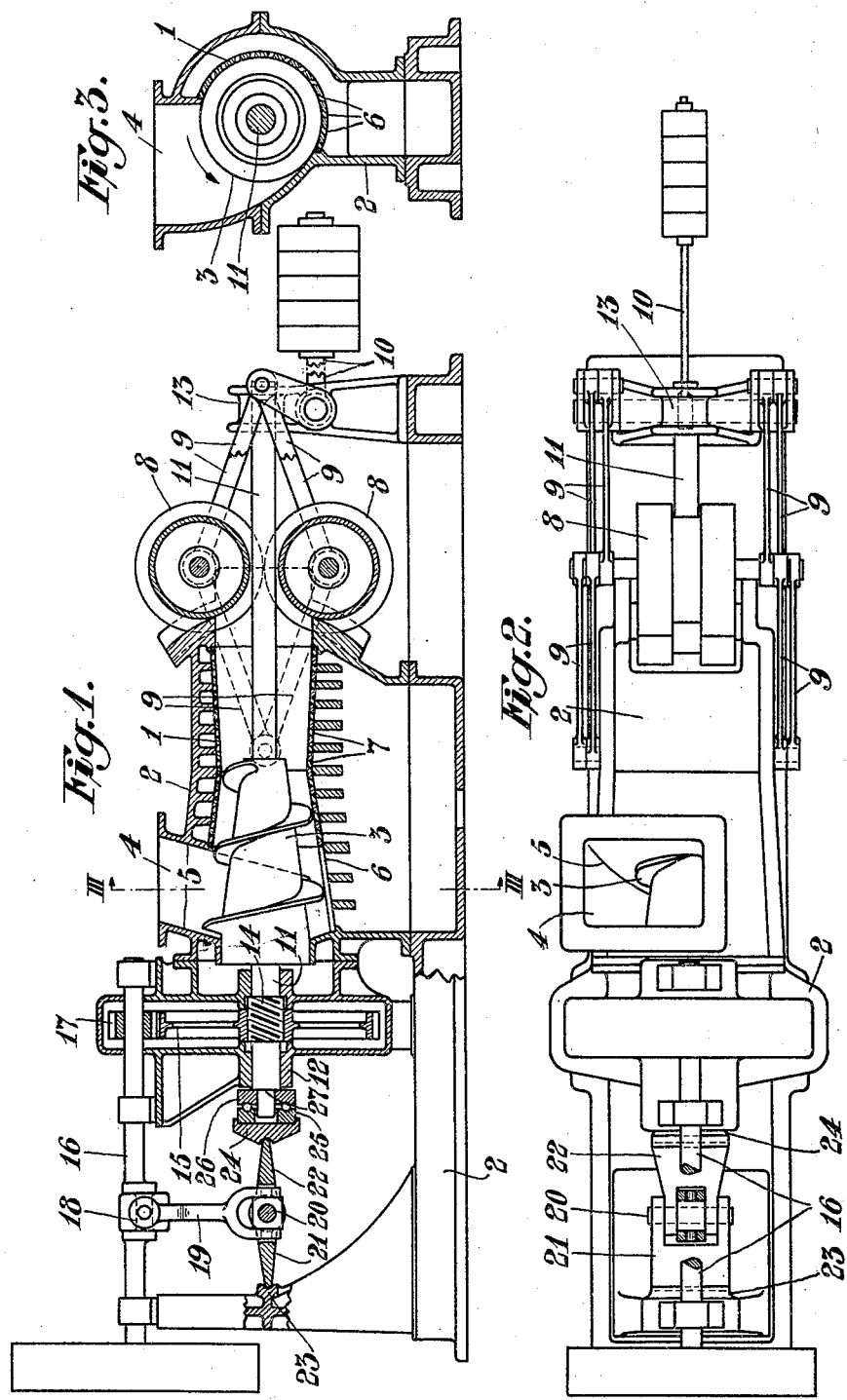
Inventor:
John Strindlund
by George Bayard Jones
Attorney.

Inventor:
John Strindlund
by George Bayard Jones
Attorney.

Patented Nov. 8, 1932

1,886,755

UNITED STATES PATENT OFFICE

JOHN STRINDLUND, OF TOFTE I HURUM, NORWAY

SCREW PRESS AND THE LIKE

Application filed March 22, 1929, Serial No. 349,049, and in Sweden April 2, 1928.

The present invention relates to an improvement in screws which are used for pumping, conveying, or conveying and concentrating viscous or doughy materials and the like. In screw pumps, screw conveyers, and screw presses the feeding is effected by the rotating screw sliding in the material which owing to friction against surrounding walls or material and also by gravity is prevented from being entrained in the rotational movement of the screw, or is only partly entrained, so that the material obtains a rectilinear or helical movement in the axial direction of the screw. On the other hand, if the friction between the material and the screw becomes too great in relation to the friction against the surrounding walls or material, the material will be entrained in the rotation of the screw and is not moved in the axial direction.

The object is thus to reduce as far as possible the friction between the screw and the material, so that the least possible rotational movement is imparted to the material. This object is attained, according to the present invention, by the screw being so arranged and connected to its driving means in such manner that during the rotation the entire screw, or a portion of the screw, is put in a reciprocating shaking or vibratory movement in the axial direction, or in a varying rotational movement, or both in a reciprocating axial and a varying rotational movement. By this arrangement the material is subjected to a varying pressure against the screw, so that the friction against the screw is reduced during the feeding operation.

Figure 4:
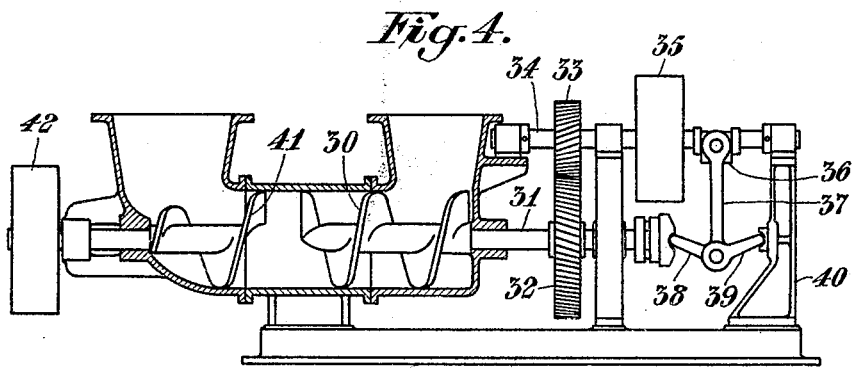
Figure 5:
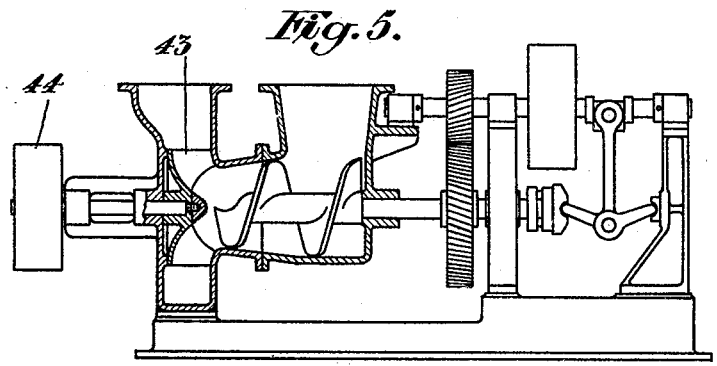
Figure 6:
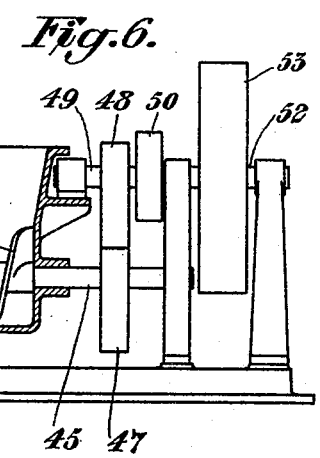
Figure 7:
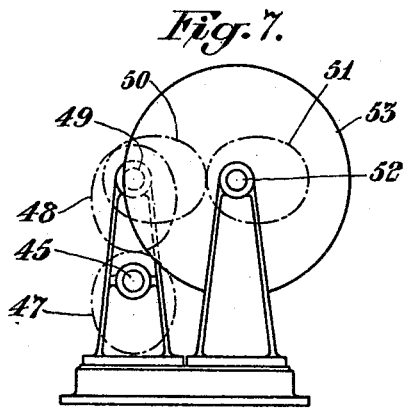

In the accompanying drawings a few embodiments of the invention are illustrated by way of example. Fig. 1 shows a longitudinal section of a machine or screw press for concentrating cellulose, Fig. 2 shows a top plan view of the machine, and Fig. 3 shows a section on the line III—III in Fig. 1. Fig. 4 shows a longitudinal section of a screw press or conveyer in which a portion only of the feed screw is given varying motion, the other portion of the feed screw being continuously rotated. Fig. 5 shows a longitudinal section of a similar screw press or conveyer in which the continuously rotating portion of the screw is replaced by a pump wheel. Fig. 6 shows a fractional longitudinal section, and Fig. 7 shows an end view of a screw press or conveyer in which only a varying rotational movement is imparted to the feed screw.

The machine illustrated in Figs. 1 to 3 inclusive consists of a perforated shell 1 which rests on flanges in the machine frame 2 and is secured to the same. Rotatably mounted in the shell 1 is a screw 3 which feeds the material introduced through an opening 4 through the shell 1. As shown in Fig. 3, the opening 4 has a substantially spiral shape in the transverse plane to the screw axis, and the side walls 5 of the opening are inclined in such manner as to practically follow the lead of the screw, as shown in Fig. 1.

When the material is fed forwards by the screw 3 it is compressed so that water is forced out through slots or holes 6 and 7 in the shell 1, the walls of said slots or holes being inclined rearwards relatively to the main direction of movement of the material.

In order to regulate the extent to which the material is being dried there are provided two rollers 8 at the discharge end of the shell 1, said rollers being rotatably mounted in a pivoted link system 9, so that by loading a lever 10 which is adapted to actuate said link system 9, said rods are forced against one another, whereby an increased resistance is offered to the material at the discharge end of the shell 1. The screw 3 is mounted on and secured to a shaft 11 which is slidable in the bearings 12 and 13 provided in the frame 2. The shaft 11 is provided with a screw-threaded portion 14 which engages interior screw-threads in the hub of a gear wheel 15 which meshes with a gear pinion 17 secured to the driving shaft 16. Provided on said shaft 16 is a crank 18 which by means of a connecting rod 19 actuates two links 21 and 22 hinged to each other by means of a pin 20 to form a toggle, the outer end of the link 21 resting in a stationary pan 23 in the frame 2, and the outer end of the link 22 resting in a pan on a plate 24 which is attached to one ball race 25 of a ball bearing the other race 26 of which rests against a shoulder 27 on the screw shaft 11.

When the driving shaft 16 rotates, the crank 18 and connecting rod 19 cause the pin 20 to move up and down, so that when the pin 20 moves upwards from the position illustrated in Fig. 1, the links 21 and 22 will form an obtuse angle which gradually decreases until the crank 18 and pin 20 reach their highest positions.

When the pin 20 moves down again, the angle between the links 21 and 22 increases until said links regain the position illustrated in Fig. 1. During the downward movement of the connecting rod 19 the right-hand end of the link 22 will thus exert an axial thrust on the plate 24 which thrust is transmitted by the ball bearing to the shaft 11. The portion 14 of the shaft is screw-threaded in such manner that the gear wheel 15 when rotated tends to move the shaft 11 to the left from the position illustrated in Fig. 1, and owing to the action above described of the links 21 and 22 the shaft 11 is returned to its extreme right-hand position. In this manner a slight reciprocating movement is imparted to the shaft 11 and thus to the screw 3, and owing to the screw-thread engagement between the shaft 11 and the gear wheel 15 such reciprocating movement will at the same time result in a varying rotational movement of the screw 3.

In the construction illustrated in Fig. 4 only a portion 30 of the feed screw is given a reciprocating axial and varying rotational movement. The shaft 31 of said screw portion 30 carries a helical or skew gear wheel 32 which meshes with a helical or skew gear wheel 33 on the driving shaft 34 to which motion is imparted by means of a belt pulley 35. Said shaft has a crank on which a block 36 is mounted, to which a connecting rod 37 is pivoted, the other end of which is pivotally connected to a toggle consisting of links 38, 39 inserted between the end of the screw shaft 31 and a stationary part of the machine frame 40, in substantial agreement with the arrangement above described in connection with Figs. 1 to 3 inclusive.

During the rotation of the driving shaft 34 a reciprocating axial movement will thus be imparted to the screw shaft 31 by said toggle device, the teeth on the gear wheels 32 and 33 having such direction as to tend to move the shaft 31 to the right in Fig. 4. Owing to the use of gears having teeth at an angle across the face the reciprocating axial movement imparted to the feed screw 30 by the toggle device will simultaneously result in a varying rotational movement of the feed screw 30, as will be easily understood. The other portion 41 of the feed screw may be driven at a continuous rate of speed by a separate belt pulley 42 mounted on the shaft of said screw portion 41.

The construction illustrated in Fig. 5 differs from that illustrated in Fig. 4 merely by the screw portion 41 in the latter being in this instance replaced by a pump wheel 43 which may be driven by means of a belt pulley 44 mounted on its shaft.

In the construction illustrated in Figs. 6 and 7 the shaft 45 of the feed screw 46 is geared by means of elliptical gears 47 and 48 to an intermediate shaft 49, which in its turn is geared by similar elliptical gears 50 and 51 to the driving shaft 52, which carries a belt pulley 53 by means of which it may be continuously driven. By this arrangement the feed screw 46 will obviously be driven with a varying rotational speed.

It will be understood that the invention is not limited to the embodiments above described and illustrated in the drawings, since various changes and modifications of these embodiments are possible within the scope of the invention as defined in the following claims.

I claim:

1. In a machine of the character described, the combination of a frame, an inlet to said frame, an outlet from said frame, a conveyer screw rotatable in said frame and adapted continuously to convey material through said frame from said inlet to said outlet, means for rotating said screw, and means for imparting to said screw a positively controlled periodically varying rotational movement.

2. In a machine of the character described, the combination of a frame, an inlet to said frame, an outlet from said frame, a conveyer screw rotatable in said frame and adapted continuously to convey material through said frame from said inlet to said outlet, means for rotating said screw, means for imparting to said screw a reciprocating movement in its axial direction, and means for imparting to said screw a positively controlled periodically varying rotational movement.

3. In a machine of the character described, the combination of a frame, a conveyer screw rotatable and axially slidable in said frame, a driving shaft, helical gears connecting said driving shaft to said screw, a toggle interposed between said frame and said screw in the axial direction of the latter, a crank on said driving shaft, and a connecting rod between said crank and said toggle.

4. In a machine of the character described, the combination of a frame, a conveyer screw rotatable and axially slidable in said frame, a shaft for said screw, a driving shaft, a gear wheel on said driving shaft, a screw-threaded portion on said shaft of said screw, a second gear wheel meshing with said first mentioned gear wheel and having an internally screw-threaded hub engaging said screw-threaded portion on said screw shaft, a toggle interposed between said frame and said screw in the axial direction of the latter, a crank on said driving shaft, and a connecting rod between said crank and said toggle.

5. In a machine of the character described, the combination of a frame, a conveyer screw rotatable in said frame, a feed hopper on said frame, said hopper being substantially spiral-shaped in a plane transverse to the axis of said screw, means for imparting to said screw a reciprocating movement in its axial direction, and means for imparting to said screw a varying rotational movement.

6. In a machine of the character described, the combination of a frame, a conveyer screw rotatable in said frame, a feed hopper on said frame, said hopper being substantially spiral-shaped in a plane transverse to the axis of said screw, the transverse walls of said feed hopper being inclined so as practically to follow the lead of said screw, means for imparting to said screw a reciprocating movement in its axial direction, and means for imparting to said screw a varying rotational movement.

7. In a machine of the character described, the combination of a frame, a conveyer screw rotatable in said frame, means for rotating said screw, means for imparting to said screw a reciprocating movement in its axial direction, means for imparting to said screw a positively controlled varying rotational movement, said frame having a discharge end, two rollers rotatably journalled at said discharge end in the transverse direction of the frame, both said rollers being movable towards and away from each other, and means for forcing said rollers towards one another.

JOHN STRINDLUND.